(12) United States Patent
Weinreich

(10) Patent No.: US 10,137,513 B2
(45) Date of Patent: Nov. 27, 2018

(54) DECK FASTENER REMOVAL TOOL

(71) Applicant: Benjamin Weinreich, Sykesville, MD (US)

(72) Inventor: Benjamin Weinreich, Sykesville, MD (US)

( * ) Notice: Subject to any disclaimer, the term of this patent is extended or adjusted under 35 U.S.C. 154(b) by 202 days.

(21) Appl. No.: 15/001,922

(22) Filed: Jan. 20, 2016

(65) Prior Publication Data

US 2016/0250697 A1 Sep. 1, 2016

Related U.S. Application Data

(60) Provisional application No. 62/105,422, filed on Jan. 20, 2015.

(51) Int. Cl.
| | |
|---|---|
| *B25B 27/14* | (2006.01) |
| *B23D 45/00* | (2006.01) |
| *B23D 59/00* | (2006.01) |
| *B23D 45/16* | (2006.01) |
| *B24D 15/02* | (2006.01) |

(52) U.S. Cl.
CPC ........... *B23D 45/003* (2013.01); *B23D 45/16* (2013.01); *B23D 59/006* (2013.01); *B24D 15/02* (2013.01)

(58) Field of Classification Search
CPC .... B23D 45/003; B23D 59/006; B23D 45/16; B24D 15/02
See application file for complete search history.

(56) References Cited

U.S. PATENT DOCUMENTS 5,423,114 A * 6/1995 Johnson ................ B23P 19/041
254/131

* cited by examiner

*Primary Examiner* — David Bryant
*Assistant Examiner* — Nirvana Deonauth
(74) *Attorney, Agent, or Firm* — Royal W. Craig; Gordon Feinblatt LLC

(57) ABSTRACT

An improved deck fastener removal tool comprising a fixture with an extended handle to hold the cutting blade of an angle grinder or like tool in plane with the top of the joist and removed a safe distance away from the operator's body. The handle may be extendable and adjustable to render it comfortable for use by multiple operators. The fixture utilizes a series of guards to ensure that the cutting blade remains level with the top of the joist along the entire length thereof, allowing the operator to walk steadily along the top of or next to the joist to quickly and safely remove each residual fastener protruding therefrom. An integrated collection tray automatically gathers the severed portions of the fasteners as they are cut.

11 Claims, 3 Drawing Sheets

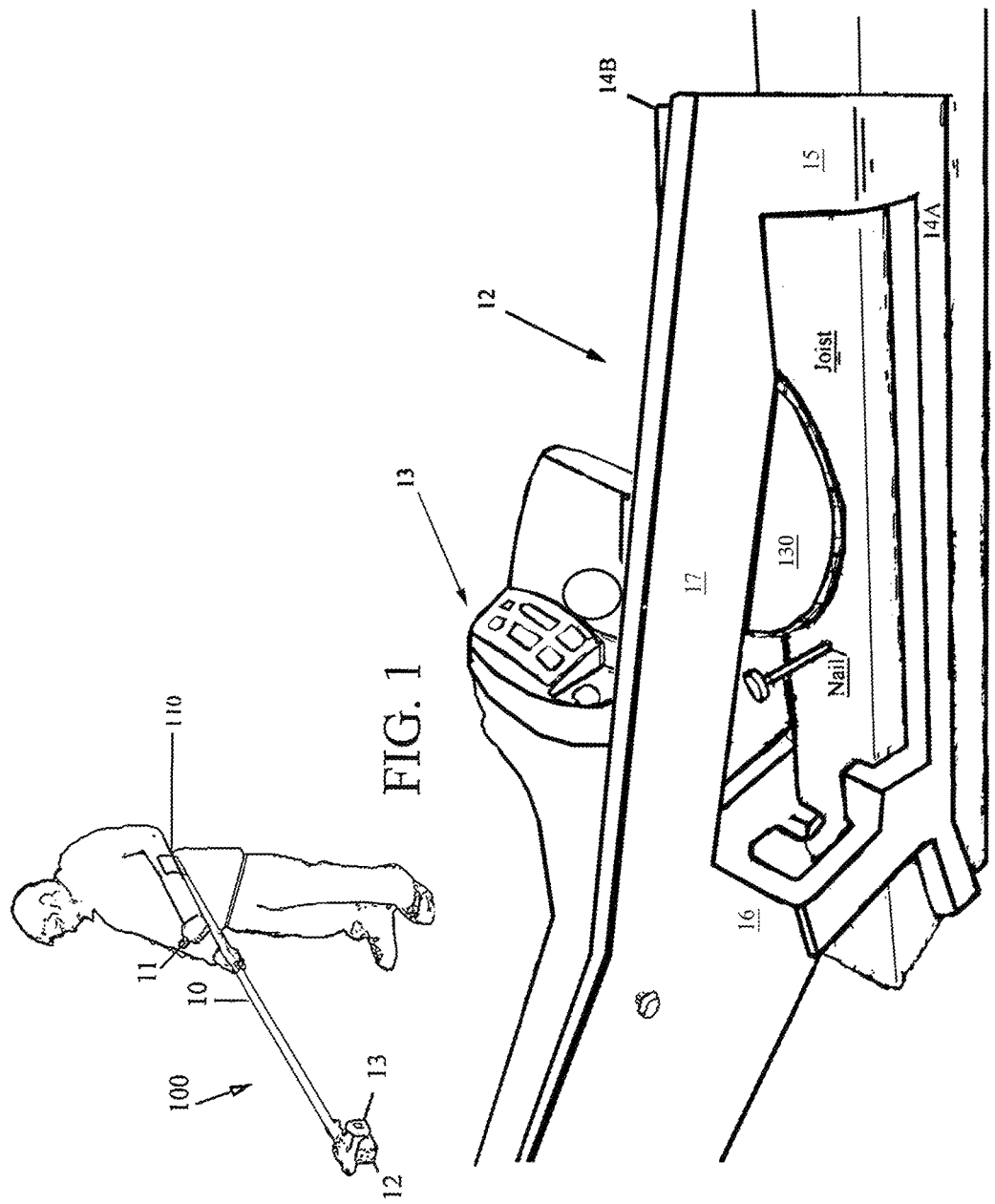

DECK FASTENER REMOVAL TOOL

CROSS-REFERENCE TO RELATED APPLICATION(S)

The present application derives priority from U.S. provisional application Ser. No. 62/105,422 filed 20 Jan. 2015.

BACKGROUND OF THE INVENTION

Field of the Invention

The present invention relates generally to demolition tools and more particularly, to tools for removing fasteners from wood materials.

Description of the Background

Outdoor decks comprise a series of deck boards nailed side-by-side atop a foundation of deck joists, which are spaced at regular intervals within the deck's framing. The size of the deck, the spacing between adjacent joists, the number of footings and beams used for the deck, and the span distance along a given joist between support elements determines the size of joist necessary for a proper foundation. Most commonly, 2×6", 2×8", 2×10" or 2×12" wooden boards may be used as joists, with the 2" side of the joist facing up to support the deck board. The deck boards are attached to the top side of the joist and perpendicular thereto by long (3") nails or other fasteners which are driven through the boards into the joists. The deck boards in turn comprise the usable top surface of the deck. To build a structurally sound deck, multiple nails are driven through each deck board at each intersection of that board with a joist. Thus, each joist receives multiple nails along its length.

From time to time it is necessary to replace some or all of the deck boards which deteriorate, and, after several re-decking cycles, the entire deck structure itself. This entails removing the deck rails and prying up the nailed-down deck boards. This is typically done with a crowbar or pry bar. The flat blade of the crowbar slides down between deck boards and the user levers each board off the foundation of joists. This motion does not provide a removal force directly along the ads of the nails during the prying operation, and transfers all of the force applied to the board directly to the next fastener in sequence as each fastener fails. Trying to pull the deck boards against the nails may cause the deck boards to shatter. Moreover, most pry bars do not provide sufficient leverage during the prying operation to fully dislodge the nails from the foundation. Consequently, the process of removing deck boards usually results in hundreds or thousands of bent, dilapidated, broken, snapped, rusted or otherwise damaged nails/fasteners still embedded in and protruding from the tops of the joists.

If the goal is to replace the old deck boards with new boards, these protruding fasteners obviously need to be removed or ground down to the surface of the joist in order to create a level surface on which to place the new board. Even where replacement of the deck boards is not an objective, removal of protruding fasteners is necessary as they are a safety hazard which could cause injury to workers who are working to dismantle the remainder of the deck or damage to their equipment. Protruding fasteners should also be removed before recycling or repurposing any of the joists that are eventually removed from the framing.

The process of removing residual decking fasteners was typically done by either pulling nails manually using a claw of a hammer or similar instrument, or by using a handheld reciprocating saw, angle grinder or similar tool to cut the fastener at its base. Both conventional methods requires the operator to bend over or kneel down at the location of each fastener to be removed in order to place the tool level with the top of the joist. Depending on the size of the deck the operator must thus kneel down beside each of hundreds or thousands of residual nails to be removed, extract or remove the residual nails, then move on to the next nail along the top of the joist. After removal of the deck boards, the remaining structure is essentially a series of thin, parallel beams (the joists), which may be the only surface for the operator to stand or kneel on in order to remove residual fasteners. The prospect of crouching, kneeling or bending several hundred times along the length of each joist is potentially daunting.

The process of operating cutting tools such as angle grinders, radial saws, and reciprocating saws is no less daunting. Tools for cutting fasteners including angle grinders and rotary saws have moving blades that can be hazardous to an operator who must position hint or herself close to the cutting area. Cutting may also result in propulsion of the jagged, cut nail head away from the cutting blade potentially toward the operator, causing yet another hazard. In addition, cutting fasteners, and particularly stainless steel fasteners used in virtually all marine decks any many other types of deck installations, generates a considerable amount of heat. Extra heat causes the saw blade to wear much more rapidly than under typical operating conditions, which limits the ability of these types of tools to be used for this purpose.

What is needed is a more convenient means for removing residual fasteners that does not require the operator to undertake the onerous task of bending repeatedly to place a tool next to the protruding fastener and level with the top of the joist. It would also be highly advantageous to have a safer means for removing residual fasteners that does not require the operator to place his or her face or body close to a moving blade or in the path of a cut fastener propelled by such a blade. Such an improved deck fastener removal tool should optimally have a means to ensure that each fastener is cut at the appropriate location to provide a safe, flat surface free of protrusions onto which new decking may be applied, if desired.

It would also be highly advantageous to provide a deck fastener removal tool which automatically collects the severed portions of deck fasteners that have been removed by the tool in a receptacle. This would solve another drawback of prior art methods, wherein jagged, severed portions of cut fasteners must be collected one by one or else be left as potentially hazardous debris on the job site.

SUMMARY OF THE INVENTION

Accordingly, it is an object of the present invention to provide an improved deck fastener removal tool that can be used by the operator from a standing position at a distance from any moving blades.

It is also an object of the present invention to provide an improved deck fastener tool that provides a close and level cut to remove any portion of a residual deck fastener that protrudes above the top of the joist, and that is repeatable for each residual fastener along the entire length of the joist and for the entire decking project.

It is also an object of the present invention to provide an improved deck fastener tool that has at integrated receptacle for collecting removed portions of fasteners to prevent them from causing a hazard to people walking in the area or being left behind as debris.

These and other features and benefits are achieved with an improved deck fastener removal tool comprising a fixture with an extended handle to bold the cutting blade of an angle grinder or like tool in plane with the top of the joist and removed a safe distance away from the operator's body. The fixture utilizes a series of guards to ensure that the cutting blade remains level with the top of the joist along the entire length thereof, allowing the operator to walk steadily along the top of or next to the joist to quickly and safely remove each residual fastener protruding therefrom. An integrated collection tray automatically gathers the severed portions of the fasteners as they are cut.

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof in which:

FIG. 1 is a perspective view of the improved deck fastener removal tool according to the present invention, in use.

FIG. 2 is a perspective illustration of the caddy portion 12 of the improved deck fastener removal tool according to the present invention.

DETAILED DESCRIPTION OF THE PREFERRED EMBODIMENTS

Figure 3:
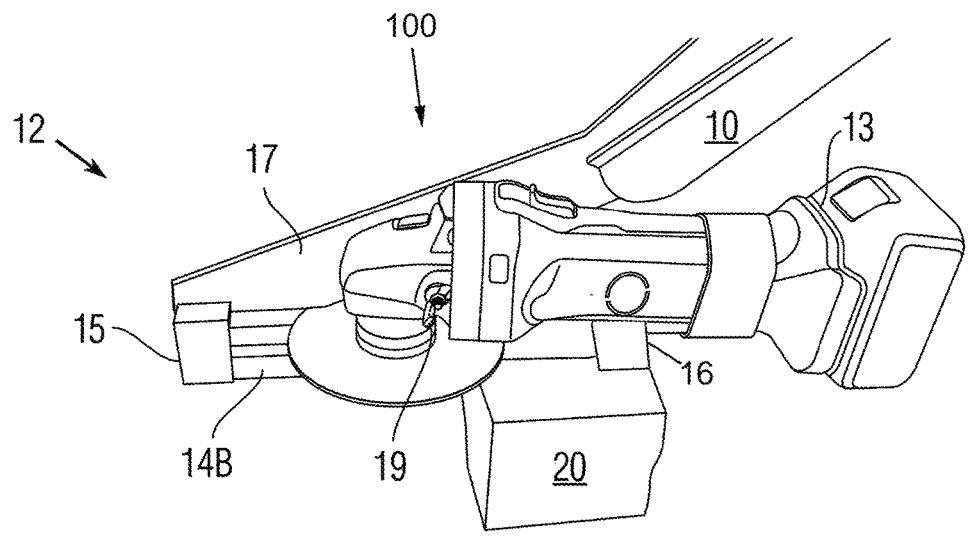
FIG. 3 is a side view of the caddy portion 12 of the improved deck fastener removal tool according to the present invention.

As seen in FIG. 1, the improved deck fastener cutting tool 100 according to the present invention generally comprises an adjustable and extendable waist-to-ground handle 10 with distal integrated caddy 12 for holding an angle grinder 13 or like cutting tool capable of severing the exposed portion of a protruding fastener even with the top of the joist. At one end of handle 10, a gripping section comprising at least a hand grip 11 that allows the operator to comfortably grip handle 10 using one or both hands, and from a standing position, to position the opposing end of handle 10 (including caddy 12 and cutting tool 13), on the top surface of an exposed joist having residual fasteners to be removed. Preferably, gripping section also includes a distal forearm cradle 110 offset from handle 10 to provide leverage over caddy 12 and cutting tool 13.

As seen in FIG. 2, caddy 12 in turn holds the rotary cutting blade 130 of cutting tool 13 flush with the top of the joist so as to cut the protruding nail (or other fastener) flush to the joist top. The tool 100 according to the present invention thus allows the operator to walk smoothly along the top of or alongside the joist, using hand grip 11 and handle 10 to pull the tool 100 along the top of the joist, and quickly decapitate multiple residual fasteners flush along one joist without bending over or lifting the tool 100 off of the joist surface.

Referring back to FIG. 1, it should be apparent that the operator can position the caddy 12 at a level even with his or her feet such that he or she can perform the fastener removal operation from a standing position on top of the joist itself. In a preferred embodiment, caddy 12 is pivotably attached to handle 10 such that an operator can also perform the fastener removal operation from a standing position on a surface that is slightly higher or lower than the top surface of the joist, such as the ground where the deck is raised off of the ground by approximately 0-3 feet. A pivoting attachment between handle 10 and caddy 12 will also allow operators of different heights to adjust handle 10 so that hand grip 11 is level with their own hand position and to operate tool 100 with ease and without bending. Importantly, handle 10 positions the operator's body at a safe distance from the cutting blade 130 of cutting tool 13 in caddy 12. However, as will be described, the operator still has a clear overhead view of the blade 130 and the exposed top of the joist and residual fasteners protruding therefrom to enable him to observe and safely perform the process of cutting exposed fasteners.

Handle 10, hand grip 11 and caddy 12 are preferably constructed from metal, and most preferably, aluminum. However, any construction material that has sufficient strength to support caddy 12 and cutting tool 13 and to withstand repeated impact from the top of the joist and other construction materials, and vibration from the cutting operation and the collection of cut fragments of fasteners, may be used. Accordingly, handle 10, hand grip 11 and caddy 12, as well as other portions of tool 100 to be described herein, may be constructed from steel, titanium, a composite material, or the like.

In a preferred embodiment, handle 10 is formed from two telescoping sections of elongate, hollow metal rod, but may also be of solid construction. Offset inwardly from its upper distal end, positioned proximate the operator's hip during use, hand grip 11 is fixedly attached and extends upward. Hand grip 11 may extend perpendicularly from that side of handle 10 that faces up during use, as shown in FIG. 1, a distance of 2-6 inches, and approximately 5-15 inches from the distal end of handle 10. This configuration allows the operator to rest his or her forearm along the axis of handle 10 while gripping hand grip 11 in a fist so as to exercise maximum control over the positioning of caddy 12 at the opposing end of handle 10. Further, in the preferred embodiment, a forearm brace 110 is disposed at the distal end of handle 10 proximate hand grip 11 or between the distal end of handle 10 and hand grip 11. Forearm brace 110 may be an upwardly-facing hollow semi-circle approximately 4-8 inches in diameter and 2-7 inches in length that is joined to handle 10 at its apex by welding or other means of attachment known in the art. One end of forearm brace 110 may be at or within 3 inches of the distal end of handle 10, such that forearm brace 110 captures the operator's forearm where it naturally falls along handle 10 when the operator grips hand grip 11. Hand grip 11 and forearm brace 110 may optionally be padded with foam padding, leather, or the like, or coated with a rubber or plastic polymer coating or the like, to increase the comfort and gripping strength of the operator. Alternatively, forearm brace 110 may be eliminated, and instead of a perpendicular element, hand grip 11 may simply be an extension of handle 10, with or without raised gripping sections or rubber or plastic polymer coating, etc. to provide an enhanced gripping surface.

Figure 6:
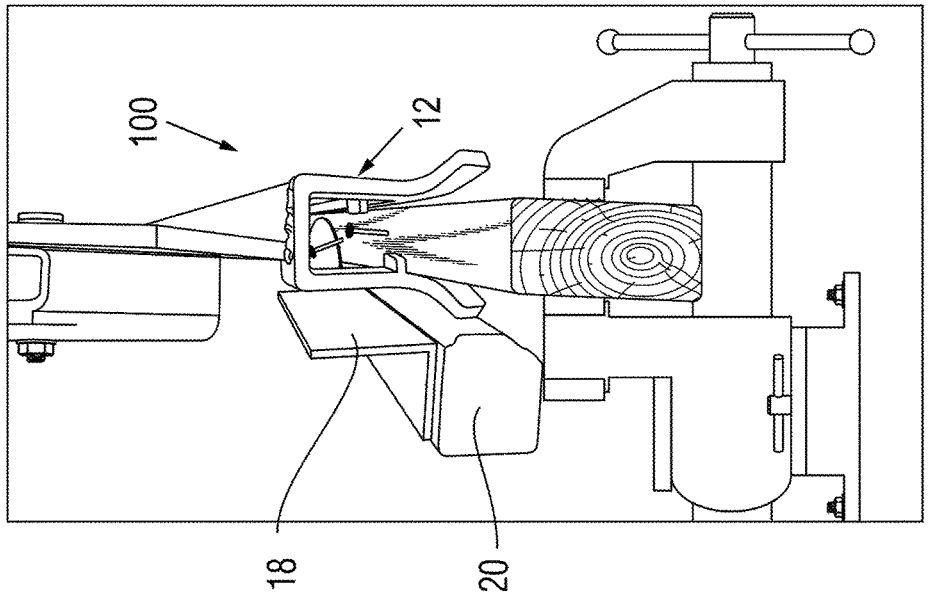
FIG. 6 is a rear view of the caddy portion 12 of the improved deck fastener removal tool according to the present invention without cutting tool 13 in holster 18.

Handle 10 may be anywhere from 3-7 feet in length. At the lower end opposite hand grip 11, caddy 12 is disposed. Referring now to FIGS. 2-6, caddy 12 generally comprises two opposing, parallel, mirror-image side rails 14A, 14B, joined at both ends by front 15 and rear 16 supports. The side of side rail 14A is visible in FIG. 2, which depicts caddy 12 as it rests on top of a joist. Side rails 14A, 14B are preferably extended, flat metal bars having a length along the plane of handle 10 of approximately 6-24 inches, a width of approximately 0.25-1.25 inches, and extending down away from front 15 and rear 16 supports a depth of approximately 0.25-2.5 inches. Side rails 14A, 14B are preferably flat on all sides, but may be curved outward along their longitudinal axes at their distal ends behind rear support 16 as shown in FIGS. 2 and 5-6. Front 15 and rear 16 supports are generally inverted U-shaped members joined at the open bottom of the U to side rails 14A, 14B, one on each side. As can be seen in FIG. 2 and as will be described further herein, rear support 16 is taller, i.e. extends further away from side rails 14A, 14B, than front support 15 to allow the protruding portions of residual nails/fasteners in the joist to pass thereunder.

Figure 4:
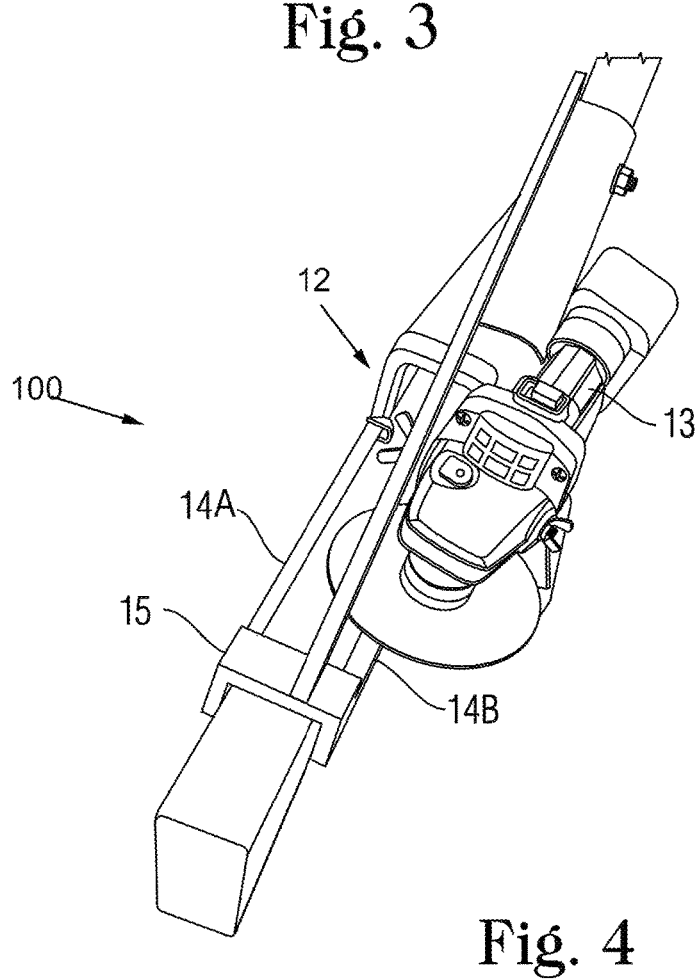
FIG. 4 is a front perspective view of the caddy portion 12 of the improved deck fastener removal tool according to the present invention.
Figure 5:
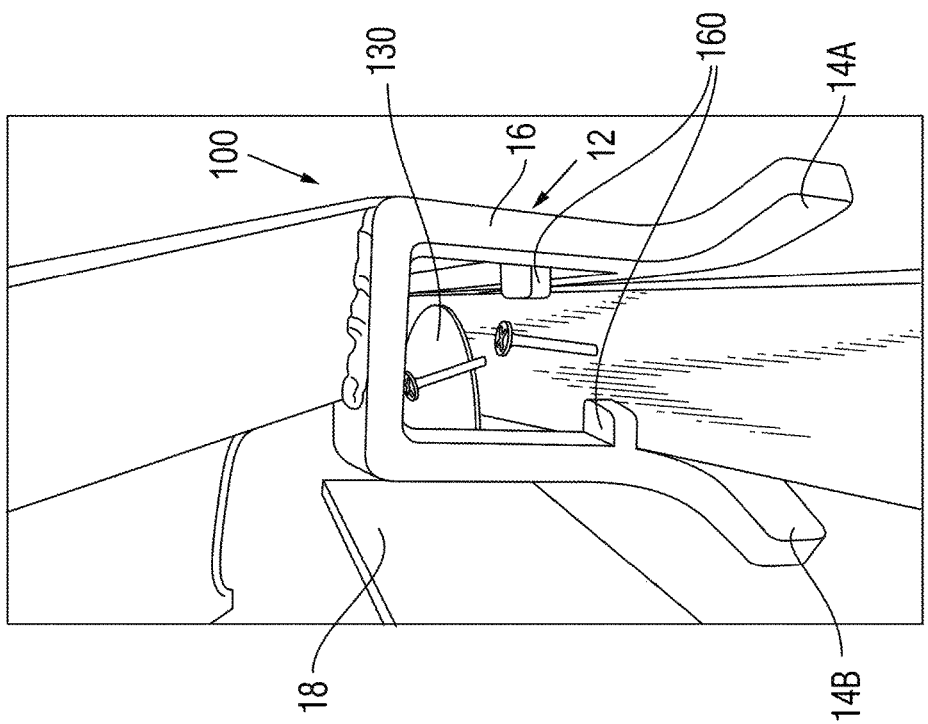
FIG. 5 is a rear view of the caddy portion 12 of the improved deck fastener removal tool according to the present invention with cutting tool 13 in holster 18.

As best seen in FIGS. 2 and 4, side rails 14A, 14B are spaced a sufficient distance apart by front 15 and rear 16 supports such that one of side rails 14A, 14B rests on either side of the top of a typical joist and front support 15 rests on the top of the joist. Most commonly, wood planks of sizes 2×6, 2×8, 2×10 or 2×12 inches are used as a joist material, with the 2 inch side facing up to receive deck boards and fasteners as shown in FIG. 4. Thus, side rails 14A, 14B may be spaced anywhere from 2-4 inches apart, and are preferably spaced between 2.25-2.25 inches apart.

FIG. 5 shows the relationship between the joist and rear support 16 during operation of tool 100. As tool 100 is pulled backwards in the direction of rear support 16) along the top of the joist, rear support 16 must "slide" over that portion of the joist from which protruding fasteners have not yet been cut. Accordingly, rear support 16 is taller than front support 15, but has at least two inwardly-projecting support tabs 160 disposed on inward facing surfaces thereof, one from each side of rear support 16, wherein the bottom surface of tabs 160 are at the same height relative to the bottom of caddy 12 as is the bottom surface of front support 15. In this way, as best seen in FIG. 2, tabs 160 and front support 15 cooperate to keep caddy 12 level on the top of the joist so that the cutting blade 130 of the cutting tool 13 can reside in the plane of the top of the joist for a level cut, as will be described. With continued reference to FIG. 5, as tool 100 is pulled backwards along the top of the joist (see arrow), protruding fasteners can pass underneath the top of rear support 16 and between the sides of rear support 16 and tabs 160 and be cut by cutting blade 130 as will be described. The newly flat surface of the joist may then pass under front support 15.

Truss 17 is attached to the upward facing surfaces of both front 15 and rear 15 supports to form the top of caddy 12 as shown in FIGS. 2 and 3. Like side rails 14A, 14B, truss 17 is preferably an extended, flat metal bar having a length along the plane of handle 10 of approximately 6-24 inches, a width of approximately 0.1-1.25 inches, and extending up from front 15 and rear 16 supports a depth of approximately 0.5-2.5 inches. Due to the height difference between front 15 and rear 16 supports, truss 17 is disposed at an angle relative to the ground in the plane of handle 10, wherein handle 10 and truss 17 preferably form an obtuse angle within the plane of handle 10. Truss 17 and rear support 16 also form the attachment point between caddy 12 and handle 10 as best seen in FIGS. 2 and 4. The attachment between caddy 12 and handle 10 may be by welding, bolt and wing nut attachment, a combination of the two, or any other means known in the art capable of forming a secure connection between handle 10 and caddy 12 which is able to sustain repeated impact and vibration from the operation of tool 100.

Truss 17 and rear support 16 also collectively support cutting tool 13 such that the cutting blade 130 is level with the joist and able to access any residual nails/fasteners protruding therefrom.

Cutting tool 13 is attached to tool 100 at two points. First, with reference to FIGS. 3 and 5-6, a holster 18 comprising two metal bars attached at right angles is welded or otherwise affixed to rear support 16. As can be seen in FIG. 6, the opening of the right angle formed by holster 18 is away from caddy 12 and the plane of the ground such that the handle of cutting tool 13 can rest thereon (see FIG. 5). As best seen in FIG. 5, holster 18 extends from the side of rear support 16 rearward towards the rear of caddy 12. When the handle of cutting tool 13 is placed in holster 18, it may be secured thereon by an industrial strength hook-and-loop fastener, such as industrial Velcro®, or by any other means known in the art for permanently or releasably attaching a hand held tool to holster 18. Truss 17 is also provided with a through-hole that aligns with a threaded side handle hole in cutting tool 13 such that a bolt may be threaded through both truss 17 and cutting tool 13 and secured therethrough with a wing nut 19 or like fastener as shown in FIGS. 2-3. The dual operation of holster 18 and wing nut 19 ensure that cutting tool 13 is held in a position such that cutting blade 130 is level with and rests immediately above the top of the joist on which caddy 12 rests. Thus, as can be seen in FIGS. 2 and 5, cutting blade will make a clean and level cut at the base of a protruding fastener to create a level to surface to the joist.

In another embodiment of the present invention, holster 18 and/or handheld cutting tool 13 may be removed in favor of a cutting blade and motor therefore (not pictured) that are integral to tool 100 itself. This arrangement would lower the overall weight of tool 100 by removing features unique to a handheld tool, such as gripping surfaces/extensions and/or additional batteries, and the like. An integral cutting blade and motor may be supported by lateral or vertical support members extending from caddy 12 to an axle of the cutting blade, or the cutting blade axle may be welded or fastened by other means known in the an directly to any portion of caddy 12 or handle 10, as long as the rotating cutting blade is positioned and held in place on plane with the top of the joist. The motor to power the integral cutting blade 130 may be any battery powered, gas powered, electric, or other motor known in the art that is durable enough and provides sufficient power to operate the cutting blade. Preferably, cutting tool 13 is selected so that tool 100 will be able to operate cordlessly.

Optionally, a collection tray 20 (see FIG. 3) may be provided to catch and collect severed portions of fasteners that are cut from the joist. Collection tray 20 may be disposed on a rear portion of the side rail 14B that is adjacent to holster 18, and may be attached thereto by welding, industrial strength hook-and-loop fastener, or by other means known in the art. Cutting tray 20 is preferably a metal box having an open top with an optional "flap" above the opening on the side furthest from the joist. With cutting blade spinning in a clockwise direction as viewed from above, portions of residual fasteners that are severed by the cutting blade 130 are gently propelled by the spinning motion of the cutting blade 130 towards and into collection tray 20 where they may be caught by the optional flap. Likewise, collection tray 20 may be positioned elsewhere relative to caddy 12 where the motion of cutting blade 130 would direct a severed portion of a fastener.

Thus, in operation, the operator, holding tool 100 using hand grip 11 (and optional forearm brace 110) positions caddy 12 on top of a joist such that side rails 14A, 14B rest on either side of the joist and front support and tabs 160 rest on the top surface of the joist. Preferably, the operator positions caddy 12 at one distal end of the joist with handle 100 facing the remaining portion of the joist. The operator then turns on the cutting tool (which may be done using a switch on the cutting tool 13 itself or with a remote power button positioned proximate hand grip 11). With cutting tool 13 on, the operator then gently pulls tool 100 towards him or her along the top of the joist such that caddy 12 slides along the top of the joist, allowing caning blade to sever all exposed portions of any residual fasteners protruding from the top of the joist, leaving a flat top surface for new deck board attachment or safe demolition of the deck.

Fastener removal tool 100 is preferably utilized in conjunction with a decking and plank removal tool, such as that described in U.S. Pat. No. 8,789,810, also by the present inventor herein, to safely and efficiently perform a deck demolition project. Thus, using a decking plank removal tool, the operator would expose several feet of the joists making up the deck frame by using the decking plank removal tool to rip one or more deck planks off of the tops of the joists. With approximately 0-12 feet, and preferably approximately 8-10 feet, of joists exposed, the operator or a second operator) may then use the instant decking fastener removal tool 100 to remove residual fasteners protruding from the tops of the exposed joists. In this way, the operator of the decking fastener removal tool 100 may remain standing on that portion of the deck from which decking boards have not yet been removed and use the extended reach of handle 10 to access the entire length of exposed joist having residual fasteners to remove any dangerous protruding portions thereof. The operation may then be repeated with the removal of more decking boards to expose another several feet of joists and the use of the decking fastener removal tool 100 to reach across those several feet of newly exposed joists to remove any protruding fasteners therefrom. This process allows the operator(s) to avoid walking on the most hazardous portion of the deck during demolition, i.e. the newly exposed frame (joists) with rusty, bent, and/or jagged decking fasteners protruding from it.

In addition, the use of the decking fastener removal tool 100 with a tool such as the lever-type decking and plank removal tool disclosed in U.S. Pat. No. 8,789,810, which also allows the user to remain upright during operation and to remove decking boards from a standing position on the still-decked portion of the deck during demolition, saves the operator the strain and time of bending over to perform the decking removal operation. In this arrangement, the user may remain upright in a safe location during the entire demolition process except as necessary to pick up the dislocated deck boards, greatly lessening the possibility of physical strain or injury to the user.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. A tool for mounting a cutting device for cutting fasteners flush with a joist of known width, comprising:
    an extended handle;
    a caddy attached to a distal end of said handle, said caddy further comprising,
    two elongate side rails having a separation width sufficient to accommodate the width of said joist,
    two inverted substantially U-shaped supports each having a closed end, and an open end joined on opposing sides to a respective side rail,
    a truss joined to and spanning the U-shaped supports, and
    at least one inwardly projecting leveling member protruding inwardly between said side rails, and
    a holster for supporting a cutting tool having a cutting blade, the cooperative arrangement of said at least one leveling member, said two side rails, and said holster maintaining said cutting blade on a plane with a top of said joist when said joist is received between said two elongate side rails.

2. The tool for mounting a cutting device according to claim 1, wherein said handle is a tubular telescoping handle.

3. The tool for mounting a cutting device according to claim 1, further comprising a hand grip offset from a distal end of said handle.

4. The tool for mounting a cutting device according to claim 3, further comprising an elbow brace mounted at a proximal end of said handle.

5. The tool for mounting a cutting device according to claim 1, wherein said two elongate side rails are substantially parallel.

6. The tool for mounting a cutting device according to claim 5, wherein said two substantially parallel side rails are angled outward at one end.

7. The tool for mounting a cutting device according to claim 6, wherein said two substantially parallel side rails are angled outward at both ends.

8. The tool for mounting a cutting device according to claim 1, wherein one of said inverted substantially U-shaped supports is longer than the other substantially U-shaped support.

9. The tool for mounting a cutting device according to claim 1, further comprising two inwardly projecting leveling members each protruding inwardly from a respective one of said side rails.

10. The tool for mounting a cutting device according to claim 1, further comprising a hook-and-loop attachment strap for securing said cutting tool in said holster.

11. The tool for mounting a cutting device according to claim 1, wherein said cutting tool is a radial saw.

* * * * *